March 19, 1946.　　E. M. MOREHOUSE　　2,396,925
SUB-ASSEMBLY CONDUIT CLIP
Filed Aug. 1, 1942
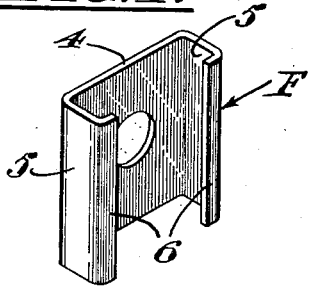
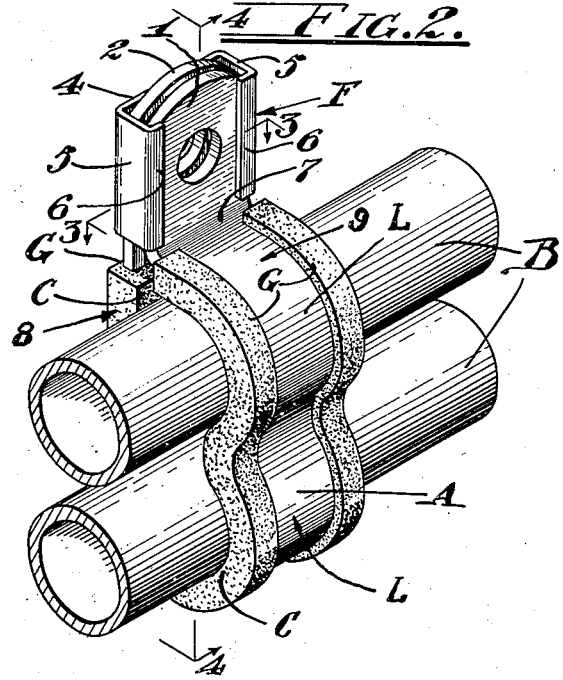
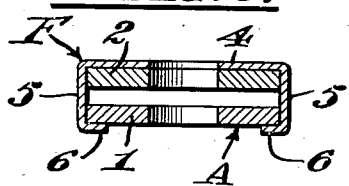
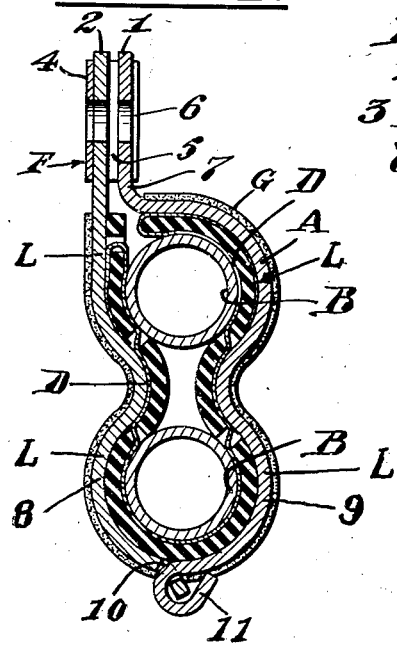
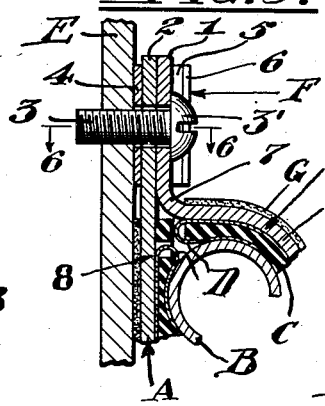
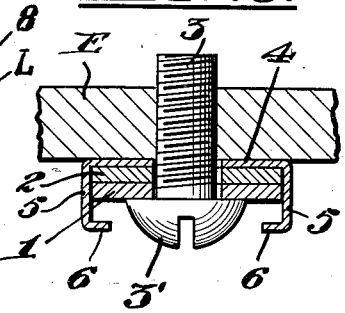
Inventor
Eugene M. Morehouse.
By R. S. Benny
Attorney Patented Mar. 19, 1946

2,396,925

UNITED STATES PATENT OFFICE 2,396,925

SUBASSEMBLY CONDUIT CLIP

Eugene M. Morehouse, Tujunga, Calif., assignor to Adel Precision Products Corp., a corporation of California Application August 1, 1942, Serial No. 453,263

1 Claim. (Cl. 248—68)

This invention relates to clips for anchoring conduit lines and the like to the metallic structural parts of aircraft, with the lines held in cushioned seats of insulation material in said clips and electrically bonded to said metallic structural parts.

Clips of the type to which the present invention relates are exemplified in United States Letters Patent No. 2,215,283 issued September 17, 1940 to Paul W. Adler and United States Letters Patents Nos. 2,279,865 and 2,279,866 issued April 14, 1942, to Herman Ray Ellinwood.

Heretofore conduit clips have been secured on the conduit lines and to the structure of the aircraft by a common means such as a bolt or screw passing through the ends of the strap and these clips because they are not provided with means for holding them in desired position on sub-assemblies of conduit lines before installation of such assemblies, are not suited for the sub-assembly installations now generally carried out in aircraft construction.

It is an object of this invention to provide a conduit clip especially designed for sub-assembly installations in that it is equipped with a simple and inexpensive clasp for holding the ends of the conduit-embracing strap together and holding the clip in the desired position surrounding the conduit or conduits in a sub-assembly before installation of the sub-assembly in the aircraft.

Another object of my invention is to provide in a clip of the character described a slip-on removable clasp which when the bolt or screw is applied to secure the clip to the aircraft permits the head of the screw or bolt to clamp said ends together; said ends automatically springing apart and retaining the clasping means in embracing and holding relation thereto when the bolt or screw is removed thereby retaining the clip on the conduit or conduits until the clasp is removed.

Another object of my invention is to provide in a clip of the character described a slip-on clasp which may be quickly and easily mounted to embrace and hold together the ends of the strap and thereby hold the clip on the conduit without requiring that said ends be forced into the face-to-face contact required when the clip is finally installed and properly gripped on the conduit; said clasp being constructed so that the screw or bolt for securing it to the aircraft will, in being tightened, engage one of said ends and cause the two ends to be forced into close contact with one another while the clasp serves as a washer between the aircraft and the clip.

A further object of my invention is to provide a conduit clip which is especially constructed for sub-assembly installation in that it is subject to being more readily opened and closed with respect to a group of conduits or the like embraced thereby and due to its resiliency and construction will normally assume an open position which will facilitate application thereof to a conduit line or lines and the temporary retention thereof on said line or lines until the sub-assembly clasp is applied.

The conduit clip provided by this invention resembles, in certain particulars, the "Temporary holding device for conduit clips" set forth in my application Ser. No. 459,215 filed September 21, 1942, which has since matured into Patent No. 2,338,658, issued January 4, 1944.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clasp as used in a clip embodying my invention;

Fig. 2 is a perspective view of a sub-assembly clip embodying my invention as applied in a sub-assembly before installation in an aircraft;

Fig. 3 is a sectional view on the line 3—3 of Fig. 2 showing the relative positions of the ends of the strap and the clasp before the clip is installed on an aircraft;

Fig. 4 is a sectional view taken on the line 4—4 of Fig. 2;

Fig. 5 is a fragmentary sectional view of the clip as completely installed in an aircraft;

Fig. 6 is a sectional view taken on the line 6—6 of Fig. 5 showing the relative positions of the ends of the strap and the clasp when the clip is completely installed.

Referring more specifically to the drawing, it is seen that one form of clip embodying my invention includes a metallic strap A adapted as here shown to embrace a plurality of conduits B seated on a cushion C of resilient compressible and insulation material carried by the strap and having associated therewith a narrow, flexible and metallic strip D for bonding the conduits to the metal strap. If the strap be made of some rigid and somewhat resilient non-metallic material, as is possible, the bonding strip would be arranged to bond the conduits to the aircraft directly.

In accordance with my invention I provide a means for temporarily holding the apertured ends 1 and 2 of the strap together independently of the screw fastening 3 which is employed to secure the clip to the airplane structural part represented by the member E in Figs. 5 and 6. This temporary holding together of the ends of the strap will facilitate sub-assembly operations in which a conduit line or lines or sections of such lines represented for example by the conduits B in Fig. 2 have clips applied at the desired points thereon and temporarily fastened by the clasping means of my invention to provide a pre-assembled conduit clip unit ready for installation as such in an aircraft. This installation is carried out by securing the clips to the aircraft structure with the screw fastenings 3 as indicated in Figs. 5 and 6. It is seen that the temporary clasping means will serve as a washer between the clip and the aircraft and remain in the installed unit in position to retain the clip on the conduit line or lines when the screw fastening 3 is removed.

One form of temporary or sub-assembly clasping means which serves the purposes hereof comprises a sleeve-like, slip-on metal clasp F of substantially rectangular outline and adapted to loosely embrace or fit over the apertured ends 1 and 2, being placed and removed endwise relative to said ends and subject to frictional retention thereon due to the tension of said ends thereagainst. Preferably the clasp F is formed of a small metal plate bent to form an apertured back wall 4, integral side walls 5 extending at right angles to the back wall, and flanges 6 formed on the outer longitudinal edges of side walls and extending at right angles and inwardly therefrom so as to overlie the ends 1 and 2 within the clasp. These flanges are spaced apart sufficiently to define a well open side of the clasp opposite the apertured end wall 4 whereby the head 3' of the fastening 3 may be moved between said flanges without interference into and out of contact with the apertured end 1 of the strap.

When the ends 1 and 2 of the strap A are brought close to one another but not necessarily in contact, after the clip has been mounted on the conduit or conduits, the operator may quickly and easily place the clasp F on said end to clasp them together and hold the clip in the desired spot on the conduit or conduits, preliminary to securing the clip to the aircraft. The clip F is of such length that on pushing it onto the ends 1 and 2 it will encounter the angularly extended portion 7 of the strap projecting from the end 1 and come to rest with the aperture in the back wall 4 in registration with the apertures in the ends 1 and 2 so that the fastening 3 may be readily inserted.

It should be noted that when the clasp F is applied as shown in Figs. 2, 3, and 4, the tension of the strap causes the ends 1 and 2 to spring apart and respectively contact the flanges 6 and back wall 4 of the clasp, leaving a space between said ends. However, the clip at this time is clamped on the conduits sufficiently to be maintained in the desired position in the clip-conduit assembly although the clip may be thereafter moved as necessary to line it up properly with the airplane structure E to which it is to be secured, following which the fastening 3 is applied and the final installation is effected as shown in Figs. 5 and 6. When the fastening 3 is screwed up tightly the head 3' lying against the end 1 between the flanges 6 will force the end 1 against the end 2 and thereby tightly clamp the clip in place with the strap under tension and the cushion C under the desired compression to afford a secure and cushioned support for the conduits.

Upon removal of the screw fastening 3 the end 1 will spring outward against the flanges 6 thereby frictionally holding the clasp F in place and the clip on the conduit or the conduit assembly as the case may be. But as the fastener is completely surrounded by the clasp, the latter cannot slip out and loosen up the mounting so long as the former is in place.

Upon removing the clasp F, as may be easily accomplished by sliding it off the ends 1 and 2, the clip may be opened to remove the conduit or conduits. In fact the resiliency of the strap and cushion will cause the ends 1 and 2 to spring apart and so remain when the clasp F is removed.

It should be noted that the cushion C has flanges G overlying the outer surface of the strap and as will be seen in Fig. 2 portions of these flanges and the back 4 of the clasp F are substantially coplanar when the clip is secured to the structure E on the aircraft, thus affording an effective seating area on the clip for contact with the structure E.

It should also be noted that while the clasp F has a loose fit fore and aft, its side walls 5 have a comparatively close fit with the longitudinal edges of the ends 1 and 2 of the strap to insure the proper alignment of said ends.

It should be noted that the clasp F is applicable to any conduit clip in which the ends of the metal strap are brought together and then secured to the aircraft structure, it being applicable to the types shown in the patents aforementioned as well as the form of clip shown in the accompanying drawing, also where the clip does not include a cushion or a bonding strip.

In the clip as here provided the strap A is formed of hinged connection sections 8 and 9 each doubly or ogee curved to define superposed loop portions L for embracing the conduits. Section 8 is provided with a slot 10 in one end through which the corresponding end of section 9 is inserted and bent back as a loop 11 thereby hingedly connecting said sections.

The cushion C is in the form of a one-piece strip which overlies the hinge joint of the sections 8 and 9. Marginal flanges 12 on the cushion embrace the longitudinal edges of the strap sections 8 and 9 to hold the cushion on the strap. The resiliency of the cushion causes the ends 1 and 2 to spring apart.

As here provided the bonding strip D is reeved through the cushion to present portions for contact with the conduit and other portions for contact with the strap.

In applying the clip to make up a sub-assembly or to position the clip on a conduit it is difficult, if not impossible, to force the ends of the strap into contact with another with the fingers due to the necessity of compressing the rubber cushion. By using the over-size clasp as here provided it is only necessary to bring the ends close to one another as can be easily accomplished and to apply the clasp.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In a conduit clip, a metal strap formed of elongated sections for embracing conduits, means hingedly connecting certain ends of said sections together, the other ends of said sections being apertured to receive a screw threaded fastening for securing the strap to a support, each of said sections being bent between its ends to define a plurality of curved portions adapted to conform to the curvature of and embrace opposite sides of the conduits, a cushion strip of resilient insulation material internally lining the strap between said apertured ends and internally overlying the hinged joint between the sections of the strap and exerting a tension tending to spread said apertured ends apart, and a screwthreaded fastening extending through the aforesaid apertured ends, the resiliency of said cushion creating a binding action against the screwthreads of said fastening.

EUGENE M. MOREHOUSE.